(12) United States Patent
Angelini et al.

(10) Patent No.: US 9,235,300 B2
(45) Date of Patent: Jan. 12, 2016

(54) ANALOG ACCUMULATOR (71) Applicants: STMicroelectronics Asia Pacific Pte. Ltd., Singapore (SG); STMicroelectronics S.r.l., Agrate Brianza (IT)

(72) Inventors: Paolo Angelini, Bologna (IT); Yannick Guedon, Mimosa Park (SG); Ming Zi Zhu, Singapore (SG)

(73) Assignees: STMicroelectronics Asia Pacific Pte Ltd, Singapore (SG); STMicroelectronics S.r.l., Agrate Brianza (MB) (IT)

( * ) Notice: Subject to any disclaimer, the term of this patent is extended or adjusted under 35 U.S.C. 154(b) by 376 days.

(21) Appl. No.: 13/853,870

(22) Filed: Mar. 29, 2013

(65) Prior Publication Data
US 2014/0292375 A1 Oct. 2, 2014

(51) Int. Cl.
G06G 7/00 (2006.01)
G06F 3/044 (2006.01)
G03G 7/00 (2006.01)
G06F 3/041 (2006.01)

(52) U.S. Cl.
CPC *G06F 3/044* (2013.01); *G03G 7/00* (2013.01); *G06F 3/0418* (2013.01)

(58) Field of Classification Search
CPC .......... G06F 3/044; G06F 3/0418; G06G 7/00
USPC ........................................................ 708/801
See application file for complete search history.

(56) References Cited

U.S. PATENT DOCUMENTS 4,563,637 A * 1/1986 De Bortoli et al. ........ 324/76.17
2010/0194444 A1 * 8/2010 Patterson ...................... 327/106

* cited by examiner

*Primary Examiner* — Tan V. Mai
(74) *Attorney, Agent, or Firm* — Gardere Wynne Sewell LLP (57) ABSTRACT

Accumulators that operate to fully or partially remove noise from a signal, including removing noise inserted into the signal by the accumulator itself. In some embodiments, an accumulator may be operated in a sampling phase and a transfer phase each time the accumulator samples an input signal. In some such embodiments, an op-amp of an accumulation circuit of the accumulator may be auto-zeroed during some or all of the sampling phases of an accumulation period. In some embodiments in which the op-amp is auto-zeroed during some or all of the sampling phases, the accumulation circuit may include a holding capacitor that, during an auto-zeroing process, holds a value output by the op-amp during a prior transfer phase. Including such a holding capacitor in an accumulator may reduce a voltage that the op-amp output rises following the auto-zero process, which may reduce a bandwidth and noise of the accumulation circuit.

40 Claims, 7 Drawing Sheets

ANALOG ACCUMULATOR

BACKGROUND

Accumulators can be used to store a result of an operation performed on an input signal and produce an output signal corresponding to the result. An accumulator, for example, may sum input signals provided to the accumulator over time and output, at a time, the sum of the input signals received up to that time. More particularly, an accumulator may sum the voltages of input signals over time and output, at a time, a signal having a voltage corresponding to the sum of the voltages received up to that time.

Accumulators can be used in circuits for creating a higher-voltage signal from a lower-voltage signal, in place of an amplifier. Accumulators may therefore be useful in such circuits when the lower-voltage signal is to be evaluated, but the low voltage of the signal may make evaluation difficult. An accumulator can produce a higher-voltage signal that is indicative of the lower-voltage signal and which can be evaluated in place of the lower-voltage signal.

SUMMARY

In one embodiment, there is provided an apparatus comprising an accumulator to operate, during an accumulation period in which an input signal is being accumulated by the accumulator, in successive sampling phases and transfer phases. The accumulator comprises a circuit to determine, during at least some of the successive sampling phases, a noise inserted by the accumulator into an accumulated signal maintained by the accumulator.

In another embodiment, there is provided an apparatus comprising an accumulator to operate, during an accumulation period in which an input signal is being accumulated by the accumulator, in successive sampling phases and transfer phases. The accumulator comprises means for determining, during at least some of the successive sampling phases, a noise inserted by the accumulator into an accumulated signal maintained by the accumulator.

In a further embodiment, there is provided an apparatus comprising a touch screen and a circuit for detecting a touch on the touch screen. The circuit comprises a capacitance-to-voltage converter to detect a capacitance of at least a part of the touch screen and output a signal having a voltage based on the capacitance and an analog accumulator to receive and, over an accumulation period, sample and accumulate the signal. The analog accumulator operates, during an accumulation period in which an input signal is being accumulated by the accumulator, in successive sampling phases and transfer phases, and comprises a circuit to determine, during at least some of the successive sampling phases, a noise inserted by the accumulator into an accumulated signal maintained by the accumulator.

In another embodiment, there is provided a method of operating an accumulator to produce an accumulated signal. The accumulator includes a sampling circuit and an accumulation circuit. The method comprising disconnecting the sampling circuit from the accumulation circuit and during a time that the sampling circuit is disconnected from the accumulation circuit, sampling an input signal to produce a sampled signal and determining a noise inserted into the accumulated signal by the accumulation circuit. The method further comprises disconnecting the sampling circuit from a source of the input signal, connecting the sampling circuit to the accumulation circuit, and transferring the sampled signal from the sampling circuit to the accumulation circuit. In the method, transferring the sampled signal comprises compensating for the noise inserted into the accumulated signal by the accumulation circuit.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Analog accumulators can be used to create a high-power signal based on a lower-power signal, such as by creating a higher-voltage signal based on a lower-voltage signal. When creating a higher-power signal based on a lower-power signal, noise in the lower-power signal may present difficulty. If noise is not removed from the lower-power signal, then the noise may be amplified when the higher-power signal is created and may mask a signal that is to be evaluated or otherwise used.

Some techniques have previously been proposed for filtering noise from signals prior to the signals being input to an analog accumulator. For example, in some conventional circuits, a low-pass filter is disposed between a source of a signal and an analog accumulator that is to receive and accumulate that signal.

Applicant has recognized and appreciated that conventional noise-filtering techniques for use with analog accumulators do not filter all noise from signals processed by an analog accumulator. For example, conventional noise-filtering techniques do not filter noise inserted into a signal by the analog accumulator itself. Some analog accumulators may include operational amplifiers ("op-amps"), and these op-amps may be a source of noise inserted into a signal by the analog accumulator. The noise inserted by an op-amp may include a DC offset of the op-amp and/or flicker noise caused by switching of the op-amp and/or other components of an accumulation circuit that includes the op-amp. Applicant has recognized and appreciated that, because conventional noise-filtering techniques do not account for the noise inserted by the analog accumulator, signals output from an analog accumulator may include an undesirable amount of noise. More particularly, Applicant has recognized and appreciated that, during an accumulation period in which the accumulator is accumulating a signal, the intrinsic noise of the analog accumulator may also be accumulated and reach an undesirable level.

Applicant has further recognized and appreciated that at least some noise inserted into a signal by an analog accumulator can be canceled and/or compensated for by auto-zeroing the analog accumulator periodically or from time to time. Auto-zeroing an analog accumulator may include disconnecting an op-amp of the analog accumulator from an input signal and connecting the op-amp to a particular voltage, which may be a ground voltage (i.e., 0 volts) for a circuit, a common mode voltage for a circuit ($V_{CM}$) that may be a non-zero voltage, or any other suitable voltage. Each time the op-amp is connected to the particular voltage, the noise inserted into the signal by the analog accumulator may be sampled and/or determined. Once sampled/determined, the noise can be canceled or compensated for.

Analog accumulators may operate over a period of time to accumulate a signal, which is referred to herein as an accumulation period. An analog accumulator may sample the signal a number of times during the accumulation period and accumulate the samples. Applicant has recognized and appreciated that auto-zeroing an accumulation circuit of the analog accumulator before a start of the accumulation period can fully or partially remove the DC offset of the op-amp, but may not satisfactorily remove flicker noise that can accumulate during the accumulation period. Over the period of time, the flicker noise inserted by the accumulation circuit of the analog accumulator may accumulate in the signal and may be observable in the signal, and may therefore affect evaluation or other use of the signal. Applicant has recognized and appreciated that by auto-zeroing the accumulation circuit of the analog accumulator from time to time during an accumulation period, the DC offset and flicker noise may be removed (fully or partially) from the signal and may not accumulate in the signal to a degree that the flicker noise may be observable in the signal and/or that the flicker noise may affect evaluation or other use of the signal.

Some analog accumulators may include, in addition to an accumulation circuit that includes an op-amp, a sampling circuit. Such analog accumulators may include a switch to connect and disconnect the sampling circuit from the accumulation circuit, and the analog accumulators may be operated in two phases during each sampling of an accumulation period: a sampling phase and a transfer phase. During a sampling phase, the sampling circuit is connected to an input terminal at which an input signal is applied and is disconnected from the accumulation circuit, and the sampling circuit samples the input signal for a time. During a transfer phase, the sampling circuit is disconnected from the input terminal and is connected to the accumulation circuit, and the sampling circuit transfers the sampled input signal to the accumulation circuit. Applicant has recognized and appreciated that noise inserted by the accumulation circuit can be fully or partially removed by, during at least some of the sampling phases of an accumulation period, auto-zeroing the accumulation circuit. Auto-zeroing during a sampling phase may include fully or partially removing the DC offset of the op-amp and/or the flicker noise of the accumulation circuit. Applicant has recognized and appreciated that it may be advantageous in some cases to auto-zero the accumulation circuit during multiple sampling phases of an accumulation period, and may be advantageous to auto-zero the accumulation circuit during every sampling phase.

Accordingly, described herein are analog accumulators that operate to fully or partially remove noise from a signal, including removing noise inserted into the signal by the analog accumulator itself. In some embodiments, as described below, an analog accumulator may be operated in a sampling phase and a transfer phase each time the analog accumulator samples an input signal. In some such embodiments, an accumulation circuit of the analog accumulator may be auto-zeroed during some or all of the sampling phases of an accumulation period.

Various examples of analog accumulators (sometimes referred to below more simply as "accumulators") are described below. It should be appreciated, however, that embodiments are not limited to being implemented according to the examples described below and that other embodiments are possible.

Analog accumulators using techniques described herein may be used in any suitable circuit or any suitable device to accumulate a signal for any suitable purpose. Embodiments are not limited to implementing an analog accumulator implementing techniques described herein in any particular environment, and are not limited to any particular device or circuit including such an analog accumulator. An example of a device that may include an analog accumulator is given below as a touch screen. A touch screen that may include an analog accumulator is described briefly below and in detail in U.S. patent application Ser. No. 13/619,328, titled "High signal to noise ratio capacitive sensing analog front end" and filed on Sep. 14, 2012 ("the '328 application"). The '328 application is incorporated herein by reference in its entirety and at least for its discussion of touch screens and circuits, for detecting a touch on a touch screen, that may include an analog accumulator. It should be appreciated, however, that embodiments are not limited to including a touch screen or a device that includes a touch screen.

Figure 1:
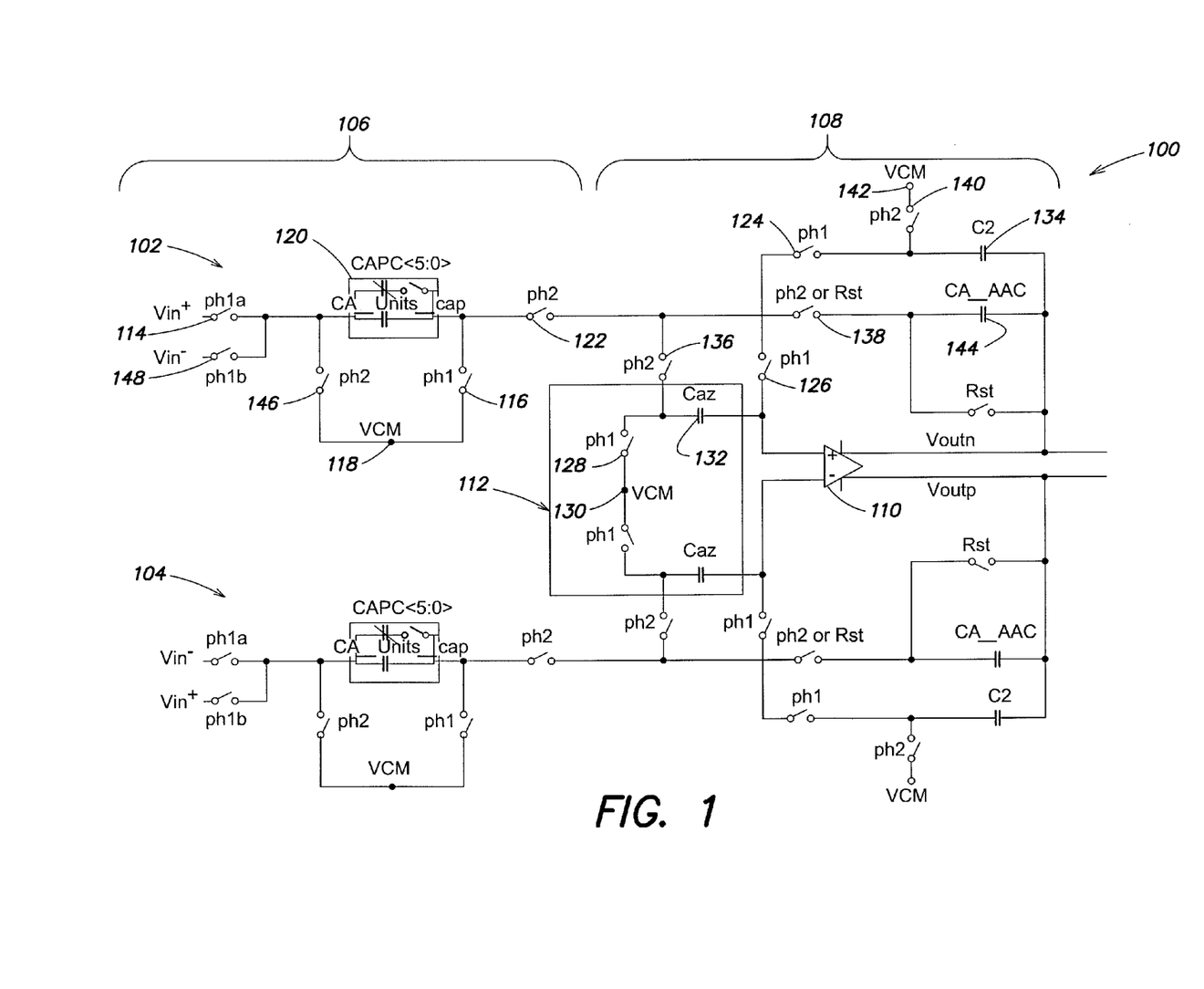
FIG. 1 is a diagram of an analog accumulator that may be implemented in some embodiments.

FIG. 1 illustrates an example of an analog accumulator 100 that may be implemented in some embodiments. Analog accumulator 100 is a differential accumulator and therefore includes a positive circuit 102 and a negative circuit 104, accepts as input two differential input signals $V_{in}^+$ and $V_{in}^-$, and outputs two differential signals $V_{outp}$ and $V_{outn}$. The operations of positive circuit 102 and negative circuit 104 of the exemplary accumulator 100 are substantially similar. For ease of description, only the operations of positive circuit 102 are described below. Those skilled in the art will understand negative circuit 104 and the manner of operation of the negative circuit 104 from the description of positive circuit 102 below. It should be appreciated, however, that embodiments are not limited to implementing a differential accumulator, and that other, non-differential accumulators can be implemented in accordance with techniques described herein.

Accumulator 100 includes a sampling circuit 106 and an accumulation circuit 108. Accumulation circuit 108 includes an operational amplifier 110. Positive circuit 102 provides an input to the non-inverting terminal of operational amplifier ("op-amp") 110, while negative circuit 104 provides an input to the inverting terminal of op-amp 110. Accumulation circuit 108 includes feedback loops such that the op-amp 110 can be operated as an accumulator. Further details of the op-amp 110 and feedback loops are provided below.

Accumulation circuit 108 further includes an auto-zero circuit 112, including a node 130 at a common-mode voltage and a capacitor 132 to store information regarding noise inserted by accumulation circuit 108 into a signal processed and accumulated by accumulator 100. Further details regarding the auto-zero circuit 112 are provided below.

Accumulator 100 is operated over an accumulation period to sample a signal. Each time the accumulator 100 samples the signal, a voltage of the signal is added to an accumulated voltage. The outputs $V_{outp}$ and $V_{outn}$ are signals that, respectively, have a positive or negative voltage corresponding to the accumulated voltage. Accordingly, the output of the accumulator 100 at any time during an accumulation period is the sum of voltages input to the accumulator 100 and sampled by the accumulator 100 to that point during the accumulation period. The output $V_{outp}$ is a sum of voltages sampled from input $V_{in}^+$ and output $V_{outn}$ is a sum of voltages sampled from input $V_{in}^-$.

Each time the accumulator 100 samples the input signals $V_{in}^+$ and $V_{in}^-$ during the accumulation period, the accumulator 100 is operated in two phases: a sampling phase and a transfer phase. During the sampling phase, sampling circuit 106 is disconnected from accumulation circuit 108 and is connected to and samples an input signal $V_{in}^+$ or $V_{in}^-$. During the transfer phase, the sampling circuit 106 is disconnected from the input signal and connected to the accumulation circuit 108, and the sampling circuit 106 provides the sample of the input signal to the accumulation circuit 108 for use in accumulation.

Figure 2:
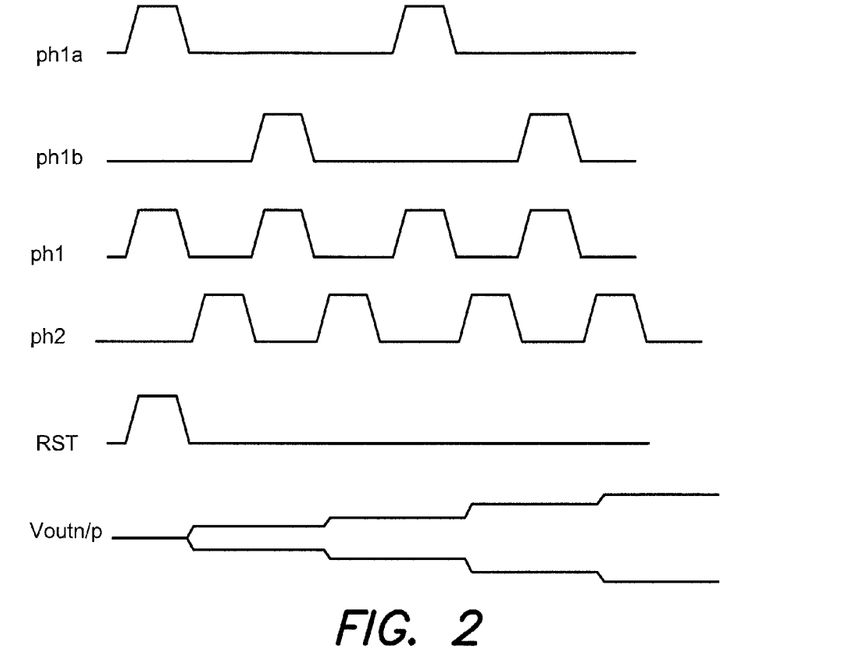
FIG. 2 is a diagram of timing signals that may be used in some embodiments with the analog accumulator of FIG. 1, and output values that may result over time due to the application of the timing signals to the analog accumulator.

The switches disposed throughout the accumulator 100 arrange the accumulator 100 for the sampling phase or the transfer phase. These switches are controlled by clock signals ph1, ph1a, ph1b, and ph2. An example of these clock signals, as well as an example of output signals $V_{outp}$ and $V_{outn}$, is provided in FIG. 2. FIG. 2 additionally illustrates a reset signal RST, which may be applied to the accumulator 100 at a start of an accumulation period to reset the accumulator 100 and prepare the accumulator 100 for accumulating a new signal without being affected by information stored for a previously-accumulated signal. For example, as a result of the reset signal RST, capacitor 144 of the accumulator 100 will be reset and may not store any charge.

FIG. 2 illustrates streams of clock pulses corresponding to ph1, ph1a, ph1b, and ph2. It should be appreciated that the streams of pulses of FIG. 2 may reflect only a portion of an accumulation period. Embodiments are not limited to operating an accumulation period of any particular length. In some embodiments, an accumulation period may include one, two, or more samples. In some embodiments, an accumulation period may include 32 samples, 64 samples, or 128 samples, or any other suitable number of samples.

Clock signal ph1 corresponds to a sampling phase of a sample and clock signal ph2 corresponds to a transfer phase of a sample. Accordingly, during a sampling phase when ph1 and ph1a have a high value, switches 114 and 116 close such that one or more capacitors 120 are included in a path between input signal $V_{in}^+$ and node 118 at common-mode voltage. During the sampling phase, the capacitor(s) 120 will be charged by the input signal $V_{in}^+$ such that the capacitor(s) 120 sample the input signal $V_{in}^+$.

During the sampling phase, ph2 has a low value. Thus, switch 122 opens to disconnect the sampling circuit 106 from the accumulation circuit 108.

As discussed above, during at least some of the sampling phases of an accumulation period, the accumulation circuit 108 is auto-zeroed to cancel and/or compensate for noise inserted by the op-amp 110 and/or other elements of the accumulation circuit 108. In the embodiment of FIG. 1, the accumulation circuit 108 is auto-zeroed during every sampling phase of an accumulation period. Thus, accumulation circuit 108 (which includes the auto-zero circuit 112) includes switches 124, 126, and 128 that are controlled by clock signal ph1. In particular, in an auto-zeroing during a sampling phase, the op-amp 110 is connected to a particular voltage, to fully or partially remove the noise that has accumulated since the op-amp 110 was last connected to the particular voltage. Any suitable voltage may be used in an auto zeroing, as embodiments are not limited in this respect. In the example of FIG. 1, the particular voltage is a common-mode voltage for the accumulator 100. Thus, during an auto-zeroing of a sampling phase, a node 130 at a common-mode voltage is connected to the op-amp 110 via switch 128 and capacitor 132. Switches 124 and 126 also close during the auto-zeroing to form a feedback loop for the op-amp 110, from output $V_{outn}$ to the non-inverting terminal of the op-amp 110, that is electrically connected to the node 130. A similar arrangement of switches, capacitors, and feedback loops is made with respect to the inverting terminal of op-amp 110.

Auto-zero circuit 112 includes capacitor 132. As a result of the auto-zeroing of the accumulation circuit 108, during which the capacitor 132 samples the voltage on the non-inverting terminal of op-amp 110, the capacitor 132 stores a voltage indicative of the noise inserted into a signal by the op-amp 110 and/or by other elements of the accumulation circuit 108. By storing in capacitor 132 the voltage indicative of the noise during a sampling phase, the accumulator 100 can subsequently compensate for the noise during a transfer phase. As discussed in more detail below, in the example of FIG. 1, during a transfer phase the sampling circuit 106 provides a sampled signal to the accumulation circuit 108 via the capacitor 132. Because the capacitor 132 is pre-charged with a value indicative of the noise, when the sampled signal is applied to the capacitor 132, the capacitor 132 will be further charged by only a difference between the voltage indicative of the noise and the voltage of the sampled signal. The pre-charging of the capacitor 132 with the voltage indicative of the noise therefore effectively removes a voltage amount of the sampled signal corresponding to the voltage indicative of the noise, and prevents this voltage amount from being added twice by the accumulator: once as a result of the noise, and again as a result of the input sampled signal. By pre-charging the capacitor 132, the accumulation circuit 132 compensates for the noise and thereby removes (fully or partially) the noise from the accumulated signal.

As a result of an auto-zeroing process like the one discussed above, an output voltage of the op-amp 110 could be returned to the particular voltage to which the op-amp 110 is connected during the auto-zeroing, which could be a ground voltage or, as in the example of FIG. 1, a common-mode voltage. If the output voltage is returned to a ground voltage or a common-mode voltage (or other suitable voltage) during each sampling phase, this could increase the slew rate and gain requirements of the op-amp 110, which may in turn increase the bandwidth and white noise inserted by the op-amp 110. The capacitor 134 is included in the accumulation circuit 108 in some embodiments to mitigate these potentially disadvantageous effects. The capacitor 134 is charged by the accumulation circuit 108 during each transfer phase and, during each sampling phase, is included in the feedback loop for the op-amp 110. As a result of the charging, during the auto-zeroing, the capacitor 134 stores a voltage value that is equivalent or substantially equivalent to the voltage of output signal $V_{outn}$ during an immediately-prior transfer phase. In this context, a value that is substantially equivalent to another may be a value within 10 percent of the other value, and a value that is equivalent to another may be a value within 5 percent of the other value.

Figure 3:
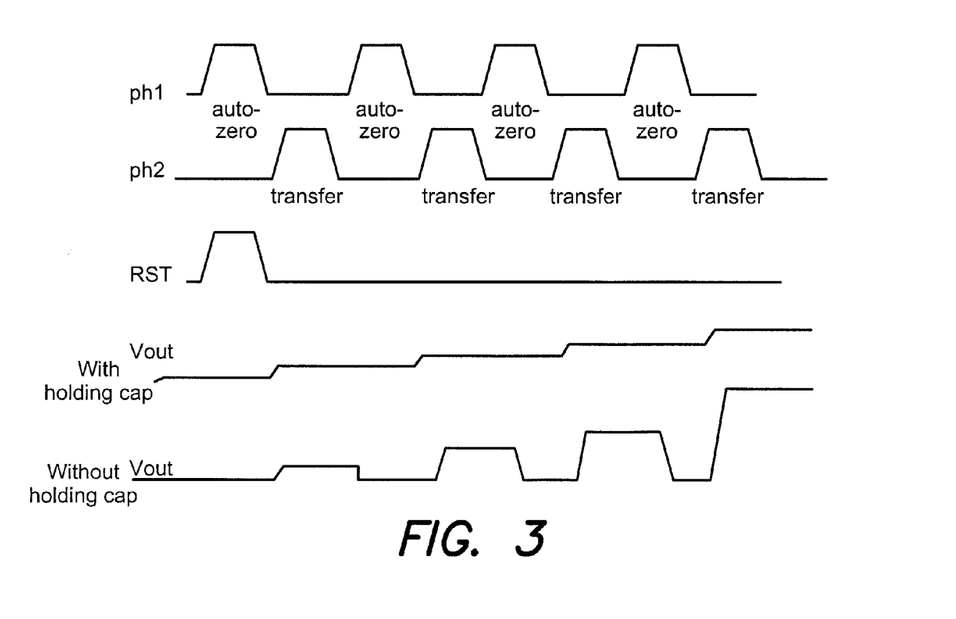
FIG. 3 is a diagram of timing signals that may be used in some embodiments with two alternative analog accumulator, and output values that may result over time due to the application of the timing signals to the analog accumulator.

Thus, in some embodiments the accumulation circuit 108 may include a capacitor 134 while other embodiments may not include a capacitor 134. FIG. 3 illustrates timing signals and voltage values for embodiments of an accumulator that includes a capacitor 134 and that do not include a capacitor 134. As illustrated in FIG. 3, an output voltage in an accumulator that includes a capacitor 134 (labeled a "holding capacitor" in FIG. 3) rises in each transfer phase and remains steady during each sampling/auto-zero phase. An accumulator that does not include a capacitor 134, however, rises in each transfer phase and returns to a particular voltage (e.g., a ground voltage or common-mode voltage) during each sampling/auto-zero phase. During successive transfer phases, an output of the accumulator without a capacitor 134 rises more and more at the beginning of the transfer phase to reach the correct output voltage that is indicative of the sum of the input voltages to that point. When the output rises more and more in this way, the accumulator may require more bandwidth and may insert more noise. Including the capacitor 134 in the circuit may therefore serve to reduce a noise inserted by the accumulation circuit 108.

As should be appreciated from the foregoing, during a sampling phase of the accumulator 100, the capacitor(s) 120 of the sampling circuit 106 are connected to and sample an input signal. Additionally, during the sampling phase, the accumulation circuit 108 is auto-zeroed and, as a result, the capacitor 132 stores a voltage indicative of the noise inserted into a signal by the accumulation circuit 108.

At the end of the sampling phase, clock signal ph1 takes a low value and the switches controlled by signal ph1 open. As illustrated in FIG. 2, after clock signal ph1 takes the low value, clock signal ph2 takes a high value and a transfer phase begins.

As a result of the change from the sampling phase to the transfer phase, switches 114 and 116 of the sampling circuit 106 open, and switches 122, 146 close to connect the sampling circuit 106 to the accumulation circuit 108. In the accumulation circuit 108, switches 124, 126, and 128 open at the end of the sampling phase to disconnect the node 130 from the circuit and remove from the accumulation circuit 108 the feedback loop that includes capacitor 134. Switches 136, 138 of the accumulation circuit 108 close to create a feedback loop for the op-amp 110 that includes the capacitor 144. Capacitor 144, which was not connected to the op-amp 110 during the sampling phase, stores a voltage value that is indicative of the sum of the input voltages supplied to the accumulation circuit 108 during the current accumulation period (e.g., since the reset signal RST was applied). By connecting the capacitor 144 in a feedback loop to the op-amp 110, the capacitor 144 can be further charged during the transfer phase by the sampled signal input to the accumulation circuit 108 during the transfer phase.

As discussed above, the sampling circuit 106 inputs the sampled signal to the accumulation circuit 108 via the capacitor 132, which enables the accumulator 100 to compensate for the noise detected by the auto-zero circuit during a previous auto-zero process of a previous sampling phase. When the sampled signal is supplied to the accumulation circuit 108 via the capacitor 132, the accumulation circuit 108 accumulates the sampled signal and produces, as output, a signal having a voltage equal to a sum of input signals received to that point during the accumulation period, where the sum includes the voltage of the sampled signal.

Additionally, during the transfer phase, switch 140 closes to connect capacitor 134 to node 142 at a common-mode voltage, such that there is a path from the output terminal $V_{outn}$ to a common-mode voltage, which enables capacitor 134 to be charged with the output of the accumulator 110 and to store a value indicative of the voltage output during the transfer phase. As discussed above, by storing such a voltage on the capacitor 134, the output of the op-amp may be kept equivalent or substantially equivalent between a transfer phase and a following sampling phase during which an auto-zero process is performed.

Following the transfer phase, the accumulator 100 enters another sampling phase. At the end of the transfer phase, each of the switches discussed above as closing at the beginning of the transfer phase open, and each of the switches discussed above as closing at the beginning of the sampling phase close.

In some embodiments, the accumulator 100 may operate substantially identically between successive sampling phases, in that the accumulator 100 may operate the same way with the same elements in each sampling phase. However, in other embodiments, such as in the example of FIG. 1, the accumulator 100 may operate differently in different sampling phases. In the example of FIG. 1, the accumulator 100 may operate in different modes in alternate sampling phases. In particular, the sampling circuit 106 may be alternately connected to one or the other of the differential inputs $V_{in}^+$ and $V_{in}^-$ during alternate sampling phases. As illustrated in FIG. 1, the sampling circuit 106 is connected to the differential inputs $V_{in}^+$ and $V_{in}^-$ via switches 114, 148 that are controlled by clock signals ph1a, ph1b, respectively. As illustrated in FIG. 2, one of the clock signals ph1a, ph1b has a high value during each sampling phase in which ph1 has a high value, and clock signals ph1a, ph1b have high values during alternate sampling phases. Thus, the switches 114, 148 are controlled to connect the sampling circuit 106 to one of the differential inputs $V_{in}^+$ and $V_{in}^-$ during alternate sampling phases. The positive and negative circuits 102, 104 may both be controlled to connect to different differential inputs during alternative sampling phases, such that the positive circuit 102 is connected during a sampling phase to the differential input signal to which the negative circuit 104 was connected during a prior sampling phase, and vice versa.

Connecting the sampling circuit 106 to different differential inputs may be advantageous in some environments, as it may assist with noise cancellation. In particular, in some environments in which the accumulator 100 may be used, a source of inputs $V_{in}^+$ and $V_{in}^-$ may be noisy, and the inputs $V_{in}^+$ and $V_{in}^-$ may include flicker noise. When the flicker noise is low frequency, the noise may appear in successive samples of the input signals. The noise may be canceled by taking advantage of the noise appearing in successive samples. In a first sampling phase, the sampling circuit 106 is connected to positive input signal $V_{in}^+$ and the capacitor(s) 120 of the sampling circuit 106 will sample and store the positive noise. During a transfer phase following the first sampling phase, the sampling circuit 106 will provide the sampled noise to the accumulation circuit 108 and the capacitor 144 will be charged based on the positive noise. During a second sampling phase following the transfer phase, the sampling circuit 106 is connected to negative input signal $V_{in}^-$ and the capacitor(s) 120 of the sampling circuit 106 will sample and store the negative noise. During a transfer phase following the second sampling phase, the sampling circuit 106 will provide the sampled signal and noise to the accumulation circuit 108 and the capacitor 144 will be charged with the negative noise. When the capacitor 144 is charged with the negative noise, the capacitor 144 loses an amount of charge based on the negative noise. Because the same amount of low-frequency noise appeared in the positive and negative samples, applying the negative noise to the capacitor 144 allows for canceling the positive noise with which the capacitor 144 was charged following the first sampling phase. The noise received by the accumulator 100 in the input signals $V_{in}^+$ and $V_{in}^-$ can thereby be canceled in some embodiments by alternately sampling different differential signals with the positive circuit 102 and negative circuit 104. It should be appreciated, however, that embodiments are not limited to operating in this manner. In some embodiments, the positive circuit 102 may sample the positive input signal $V_{in}^+$ during each sampling phase and the negative circuit 104 may sample the negative input signal $V_{in}^-$ during each sampling phase.

In embodiments that include one or both of the switches 114, 148 of the sampling circuit 106, switch 114 and/or switch 148 may operate as a chopper circuit for the accumulator 100. A chopper circuit may operate to modulate noise included in a signal to a higher frequency, so the noise may be more easily canceled. More particularly, a signal that is input to the circuit 400 may include noise in addition to the signal, and the signal may be oscillating at a particular frequency. A chopper circuit can be used to convert the oscillating signal to a DC signal and to modulate the noise to a higher-frequency portion of the spectrum. By converting the oscillating signal to a DC signal, the signal may be more easily processed by accumulation circuit 108 of accumulator 100. Additionally, by modulating the noise to a higher-frequency portion of the spectrum, the noise may be more easily filtered using a low-pass filter, such as a filter implemented in the sampling circuit 106 (e.g., variable-capacitor circuit 400 of FIG. 4, discussed below).

Embodiments are not limited to implementing any of the components of the exemplary accumulator 100 illustrated in FIG. 1 in any particular manner. Any suitable arrangement of electrical components may be used to carry out the functionality of accumulator 100 discussed above. For example, capacitor(s) 120 of the sampling circuit 100 may be implemented as any suitable combination of one or more capacitors and/or other energy storage devices. In some embodiments, capacitor(s) 120 may be implemented as a switched capacitor circuit including multiple capacitors. In other embodiments, capacitor(s) 120 may be implemented as a programmable variable-capacitance circuit including an arrangement of switches and capacitors.

Figure 4:
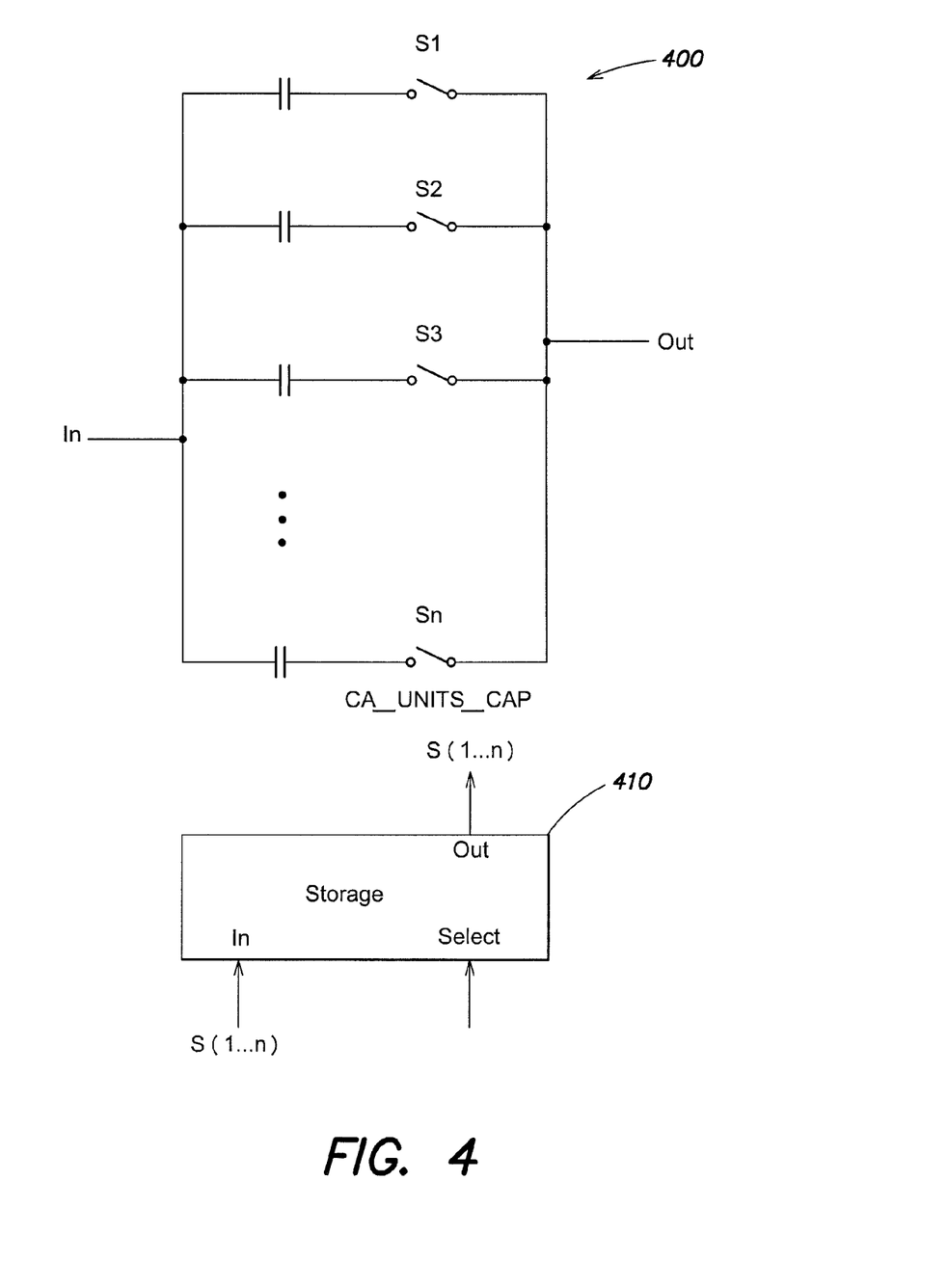
FIG. 4 is a diagram of a circuit that may be implemented in some embodiments as at least a part of a sampling circuit in the analog accumulator of FIG. 1.

FIG. 4 illustrates an exemplary programmable variable-capacitor circuit 400 that may be implemented in a sampling circuit of an accumulator in some embodiments. As illustrated in FIG. 4, the circuit 400 includes multiple capacitors and switches arranged in parallel. Each capacitor corresponds to a switch and can be added or removed from the circuit 400 by operation of the corresponding switch.

A variable-capacitor circuit such as the circuit 400 of FIG. 4 can be operated as a filter for noise included in a signal. In some embodiments, the circuit 400 can be programmed to perform a particular type of filtering of an input signal by setting the overall capacitance of the circuit 400 to a particular value. In embodiments in which the circuit 400 can be programmed, the circuit 400 may be programmed with values that set the state of switches of the circuit 400 to add and remove capacitors in the circuit 400 and thereby affect the capacitance of the circuit 400. In some such embodiments, the circuit 400 may be programmable once, such as during manufacturing, such that values indicating the states of the switches of the circuit 400 are set once and cannot be set again. In some other embodiments, the circuit 400 may be programmable more than once, such that, in some cases, the circuit 400 may be programmable at any time. For example, the circuit 400 may be programmable to implement a filtering window at a start of an accumulation period and/or, in some cases, during an accumulation period.

As illustrated in FIG. 4, the circuit 400 may include a storage 410 that accepts at an input terminal values s(1 . . . n) indicating the state of switches S1 . . . Sn of the circuit 400 and stores the values received at the input terminal. The storage 410 may then output the values s(1 . . . n) to set the state of switches S1 . . . Sn. The storage 410 may be any suitable storage, including a Programmable Read-Only Memory (PROM), an Electronically-Erasable Programmable Read-Only Memory (EEPROM), a Random Access Memory (RAM), a volatile or non-volatile memory, or any other suitable form of tangible, non-transitory storage, as embodiments are not limited in this respect.

The values with which the circuit 400 is programmed may be any suitable values, as embodiments are not limited in this respect. In some embodiments, the storage 410 may store a single set of values and the states of the switches of the circuit 400 may be set according to the single set of values during each accumulation period and/or each sampling phase. In other embodiments, the storage 410 may store multiple sets of values. In some embodiments in which the storage 410 stores multiple sets of values, the states of the switches of the circuit 400 may be set at a beginning of an accumulation period according to one of the sets of values, such as based on an input (such as to a select terminal of storage 410) selecting one of the sets of values. In some such embodiments, once the states of the switches are set at a beginning of an accumulation period, the switches may stay in the same configuration for each sampling phase of the accumulation period.

In some other embodiments, the storage 410 may store multiple sets of values and the states of the switches may be changed between sampling phases, such that the capacitance of the circuit 400 is changed between sampling phases of an accumulation period. By changing the capacitance of the circuit 400 between sampling phases, the circuit 400 can be used as a filter having filtering windows of different shapes.

A programmable variable-capacitance circuit, like the circuit 400 of FIG. 4, can be configured to operate as various kinds of filters, including a rectangular window filter, triangular window filter, and Hamming window filter. The circuit 400 can be arranged as a rectangular window filter by setting the switches of the circuit 400 to particular states (and thereby adding/removing capacitors and setting the capacitance of the circuit 400 to a certain value) and maintaining those states (and that capacitance value) throughout an accumulation period. The circuit 400 can be arranged as a triangular window filter, a Hamming window filter, or as another form of filter by varying the states of switches and the overall capacitance of the circuit 400 between sampling phases of the same accumulation period.

For example, to configure the circuit 400 as a triangular window filter, the switches may be set in successive sampling phases such that an overall capacitance of the circuit 400, in each of the successive sampling phases, is (in picofarads):

0.05, 0.15, 0.25, 0.35, . . . , 6.25, 6.35, 6.5, 6.25, 6.15, . . . , 0.25, 0.15, 0.05 Depending on the values of the capacitors included in the circuit 400, the switches may be set to particular states to achieve a capacitances of 0.05 pF, 0.15 pF, etc. Any suitable set of overall capacitance values and switch states may be used, as embodiments are not limited in this respect. In some embodiments, the capacitance values that are used may be set based on a number of samples to be taken by the accumulator during an accumulation period. In the example of capacitance values given above, there are 128 different capacitance values in the range of 0.05-6.35-0.05, which corresponds to a capacitance value for each of 128 samples, which may be used in an accumulator that takes 128 samples during an accumulation period. Other accumulators may take other numbers of samples during accumulation periods. Some accumulators may, for example, take 64 samples during an accumulation period, and others may take 32 samples, and still others may take any other number of samples. In accumulators that take 64 samples during an accumulation period, the following overall capacitances of the circuit 400 in each sampling phase may be used:

0.1, 0.3, 0.5, 0.7, . . . , 5.9, 6.1, 6.3, 6.3, 6.1, 5.9, . . . , 0.7, 0.5, 0.3, 0.1 In accumulators that take 32 samples during an accumulation period, the following overall capacitances of the circuit 400 in each sampling phase may be used:

0.2, 0.6, 1, 1.4, . . . , 5.4, 5.8, 6.2, 6.2, 5.8, 5.4, . . . , 1.4, 1, 0.6, 0.2 It should be appreciated that any suitable capacitance values may be used for any suitable form of filtering, as embodiments are not limited in this respect. In embodiments in which a triangular filtering window is implemented, any suitable capacitance values may be used, including capacitance values that differ from the three examples given above. Though, in some embodiments, the capacitance values given above or capacitance values similar to those given above may be advantageous. In particular, in some environments it may be advantageous to use sets of capacitance values for which a difference between the sums of the sets of capacitance values is directed proportional to a difference in the number of samples for which those sets of capacitance values are to be used. The examples given above correspond to 128 samples, 64 samples, and 32 samples in an accumulation period. The sum of the capacitance values across the accumulation period, for each of the examples, is 409.6 pF, 204.8 pF, and 102.4 pF, respectively. Accordingly, the total capacitance across the accumulation period doubles as the number of samples doubles when the exemplary capacitance values discussed above are used. In these examples, when the total capacitance doubles, the gain inserted into a signal by the circuit 400 also doubles. Therefore, when the above capacitance values or other similar capacitance values are used, an effect on gain of an increased number of samples can be easily predicted and known, as a difference in gain is directly proportional to a difference in number of samples.

An accumulator implemented in accordance with techniques described herein may be used in any suitable circuit, as embodiments are not limited in this respect. In some embodiments, as discussed above, an accumulator may be implemented as a part of a touch screen. An example of a touch screen with which an accumulator may be used in some embodiments is described below in connection with FIGS. 5-7. Additional details regarding touch screens and examples of touch screens with which accumulators may be used are discussed in the '328 application, referenced above and incorporated herein by reference in its entirety.

A touch screen is a device that can detect an object in contact with or in proximity to a display area. The display area can be covered with a touch-sensitive matrix that can detect a user's touch by way of a finger or stylus, for example. Touch screens are used in various applications such as mobile phones and other mobile devices. A touch screen may enable various types of user input, such as touch selection of items on the screen or alphanumeric input via a displayed virtual keypad. Touch screens can measure various parameters of the user's touch, such as the location, duration, etc.

One type of touch screen is a capacitive touch screen. A capacitive touch screen may include a matrix of conductive lines and columns overlaid on the display area. In mutual capacitance sensors, the capacitance between each line and column of the matrix may be sensed. A change in capacitance between a line and a column may indicate that an object, such as a finger, is touching the screen or is in proximity to the screen near the region of intersection of the line and column. Mutual capacitance sensing circuits employ a "forcing" signal applied to a column conductor of the capacitive touch matrix and sensing of the coupled signal on respective line conductors. The capacitance change caused by a finger may be small, on the order of 50~100 fF (typically 5% of Cs=1~2 pF). Noise reduction may therefore be important in achieving satisfactory operation of the touch screen.

In some touch screens with which the accumulator may be used, the processing of noise is performed in the analog domain. The noise is accumulated and filtered, while the signal is accumulated and amplified. Using this approach, the signal-to-noise ratio at the output of an analog accumulator is enhanced as compared to the signal-to-noise ratio at the output of the capacitance-to-voltage converter. Therefore, the swing of the signal may be increased at the input of the analog-to-digital converter. After a number of samples during an accumulation period, an analog-to-digital conversion is performed.

Figure 5:
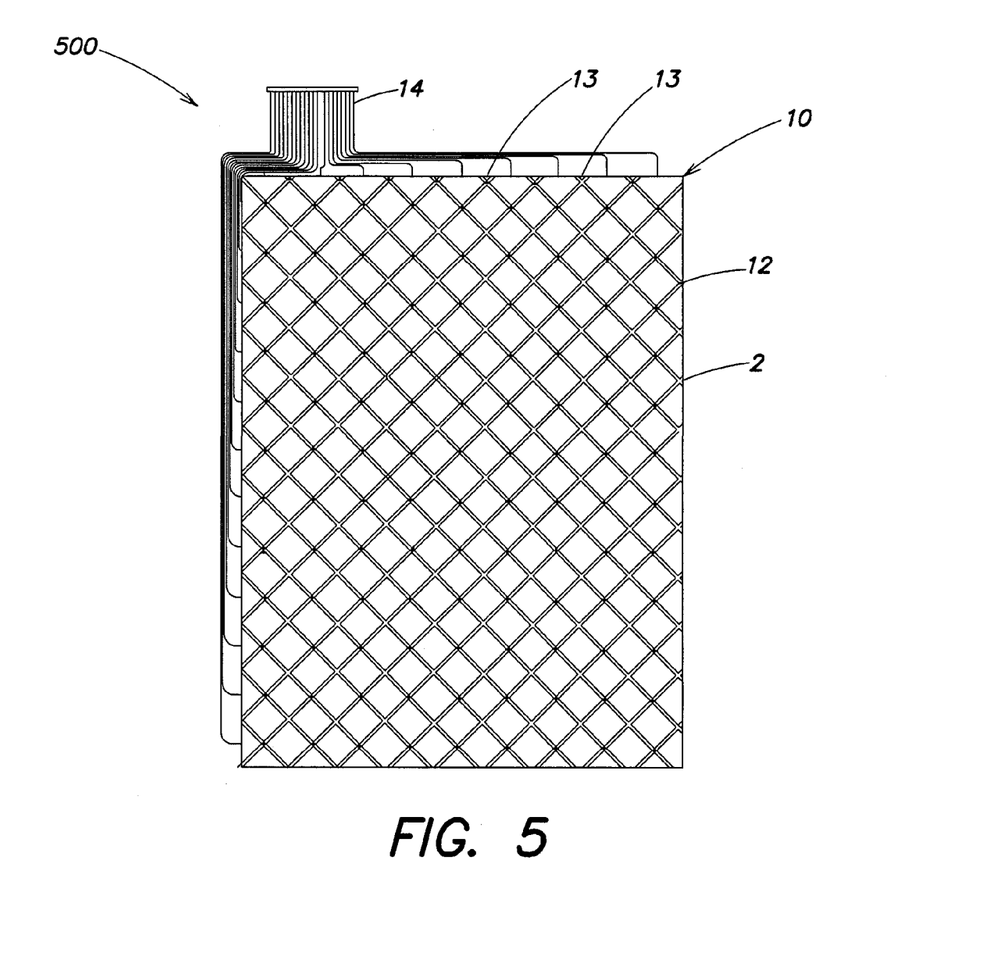
FIG. 5 is a schematic representation of a capacitive touch matrix, with which some embodiments may operate.

FIG. 5 shows an example of a touch screen 500 having conductive lines 12 and conductive columns 13 of a capacitive touch matrix 10, arranged in a diamond pattern. The capacitive touch matrix 10 may be transparent to allow light from an underlying display unit to pass through the capacitive touch matrix 10 for viewing by a user. Multiple conductors 14 may be provided for making contact to conductive lines 12 and conductive columns 13. Conductive lines 12 and conductive columns 13 may cover substantially the entire face of the touch screen 500, enabling touch and proximity detection at substantially any location on the touch screen 500.

Figure 6:
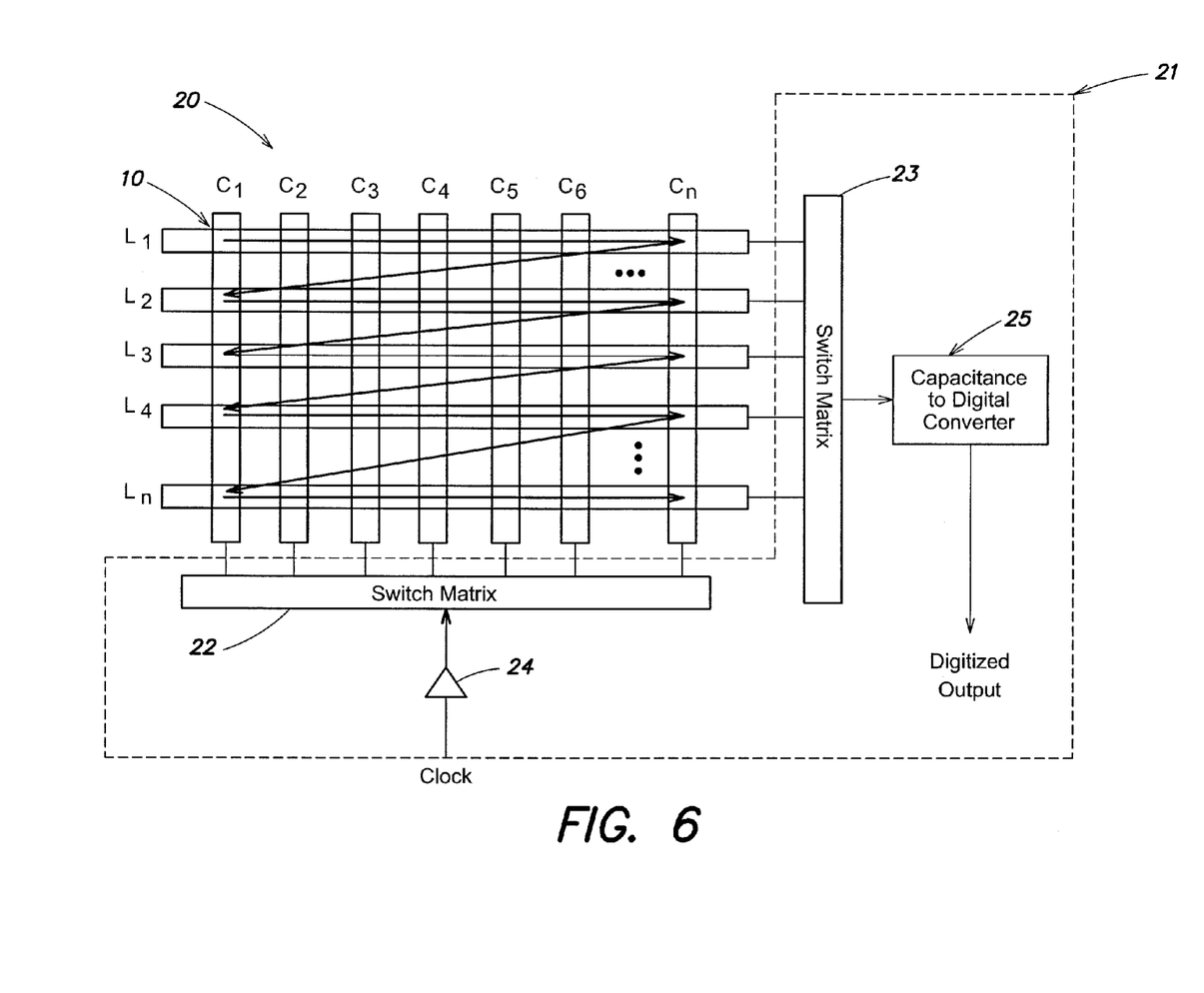
FIG. 6 is a schematic diagram of a touch screen system, illustrating scanning of the elements of a capacitive touch matrix, with which some embodiments may operate.

FIG. 6 is a block diagram of a touch screen system 20 that includes the capacitive touch matrix 10 and an associated sensing circuit 21. As discussed above, the capacitive touch matrix 10 may have a diamond pattern, which is not shown in FIG. 6 for clarity. The sensing circuit 21 includes a column switch matrix 22 and a line switch matrix 23 for selection of columns and lines of the capacitive touch matrix. The column switch matrix 22 may receive a clock signal from a buffer 24 for timing the switch selection and scanning of the capacitive touch matrix. The line switch matrix 23 may select one or more lines for readout. The charge sensed from the capacitive touch matrix may be converted to a digital value by a capacitance-to-digital converter 25, as discussed below.

The lines and columns of the capacitive touch matrix 10 may be scanned in any suitable manner. For example, the capacitance may be sensed between column C1 and lines L1-Ln, then sensed between column C2 and lines L1-Ln, and so on until column Cn and lines L1-Ln. However, it should be appreciated that this is only an example of a suitable scanning sequence and that any suitable scanning sequence may be used.

At each scanning step, a measurement may be taken from the line/column pair that represents the capacitance between the selected line/column pair. For example, the capacitance between the selected line/column pair may be charged to a determined voltage value. The amount of charge stored depends on the capacitance between the line/column pair. The capacitance between the selected line and column may change when an object is touching the touch screen near the intersection area of the line and column and alters the electric field in this region. To determine whether an object is in the vicinity, the stored charge can be read out and converted into a voltage that is then digitized.

Figure 7:
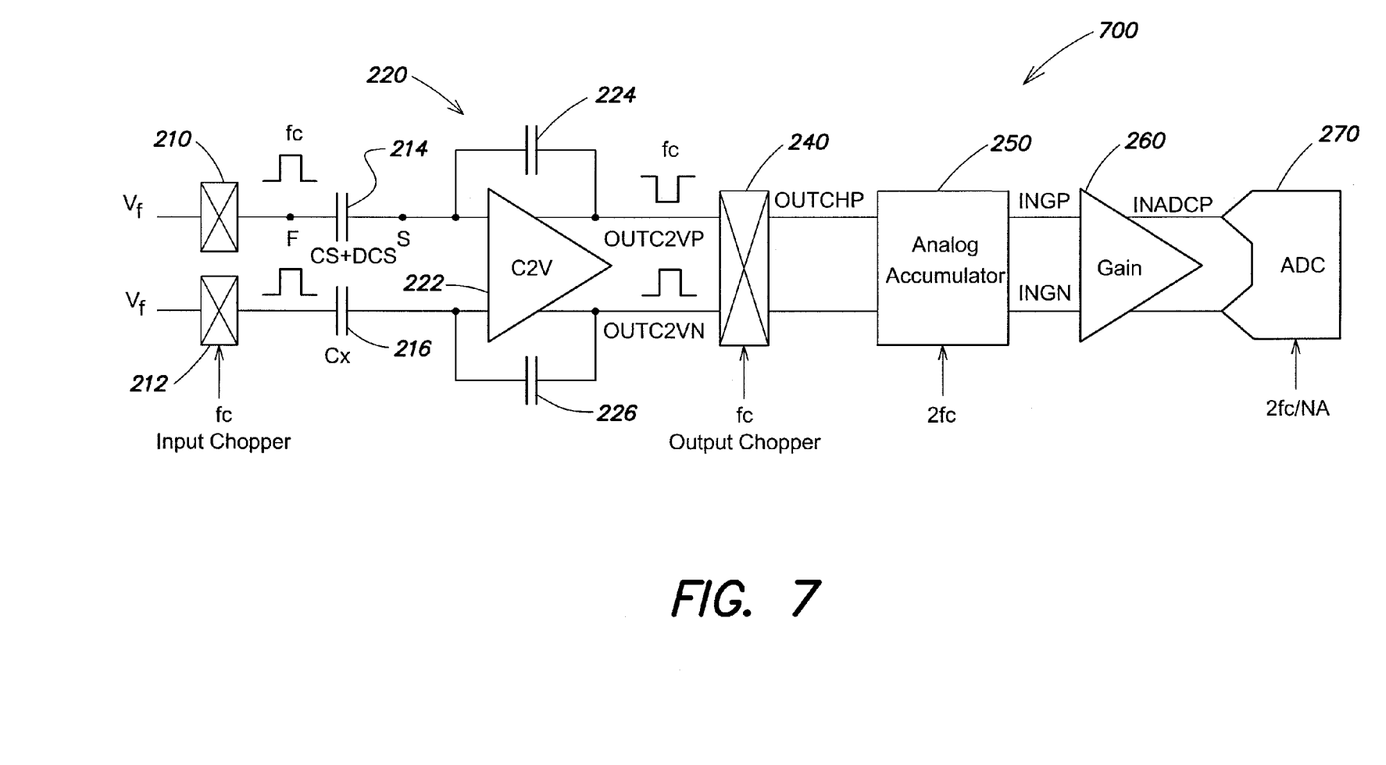
FIG. 7 is a schematic diagram of a differential capacitance sensing circuit, with which some embodiments may operate.

A schematic block diagram of a fully differential capacitance sensing circuit 700 in accordance with embodiments is shown in FIG. 7. An element of the capacitive touch matrix is represented by matrix element capacitance 214. A DC voltage Vf is chopped by input chopper 210 at modulation frequency fc to provide a squarewave output at frequency fc. The squarewave output of chopper 210 is applied to force node F, causing capacitances 214 to be charged.

A sensing signal at sense node S is applied to a differential capacitance-to-voltage converter 220. Capacitance-to-voltage converter 220 may include a differential amplifier 222 having an integration capacitance 224 (Cc/2) in a feedback path between an inverting input and a first output of amplifier 222, and an integration capacitance 226 (Cc/2) in a feedback path between a non-inverting input and a second output of differential amplifier 222. The matrix element capacitance 214 is connected via force node F to the inverting input of differential amplifier 222. The cancellation capacitance 216 is connected to the non-inverting input of amplifier 222 and an input chopper 212 supplies a squarewave at modulation frequency fc through cancellation capacitance 216 to capacitance-to-voltage converter 220. The outputs of differential capacitance-to-voltage converter 220 are squarewaves having amplitudes that are a function of the change in capacitance produced by the user's finger.

The outputs OUTC2VP and OUTC2VN of capacitance-to-voltage converter 220 are supplied through a differential output chopper 240 to a differential analog accumulator 250. The analog accumulator 250 may be implemented in any suitable manner, including according to techniques described herein. The squarewave outputs of capacitance-to-voltage converter 220 are chopped by output chopper 240 at modulation frequency fc to produce DC outputs OUTCHP and OUTCHN that are representative of the capacitance being sensed. The output chopper 240 functions as a rectifier of the squarewaves at its inputs. In some embodiments, the chopper 240 may be integrated into the analog accumulator 250, such as when a sampling circuit of the accumulator 250 includes a chopper circuit (e.g., circuit 400 of FIG. 4, above). In other embodiments, however, the circuit 700 may include a chopper circuit 240 in place of a chopper integrated into the accumulator 250, or may include both a chopper 240 and a chopper integrated into the accumulator 250.

The analog accumulator 250 accumulates DC voltage values produced by capacitance-to-voltage converter 220 on successive sensing cycles, over an accumulation period having a defined number NA of cycles. The DC outputs of output chopper 240 on each cycle are summed with intermediate accumulated values from previous cycles. After NA cycles, the analog accumulator 250 provides accumulated analog values, INGP and INGN. In some embodiments, the analog accumulator 250 may additionally perform a low pass filtering function to filter wideband noise above a cutoff frequency.

The outputs INGP and INGN of differential analog accumulator 250 are supplied through a differential gain amplifier 260 to a differential ADC 270. The gain amplifier 260 adjusts the range of the analog accumulator 250 output to match the input range of ADC 270. The output of ADC 270 is a digital value that represents a value of the capacitance being sensed. The analog accumulator 250 and the gain amplifier 260 may operate at twice the modulation frequency 2fc, and the ADC 270 operates at twice the modulation frequency 2fc divided by the defined number NA of cycles in the accumulation period.

Accordingly, in some embodiments an analog accumulator as described herein may be implemented in a touch screen. It should be appreciated, however, that embodiments are not limited to including a touch screen or operating with a touch screen. Accumulators operating in accordance with techniques described herein may be implemented in any suitable circuit or any suitable environment, and accumulate any suitable signal.

Figure 8:
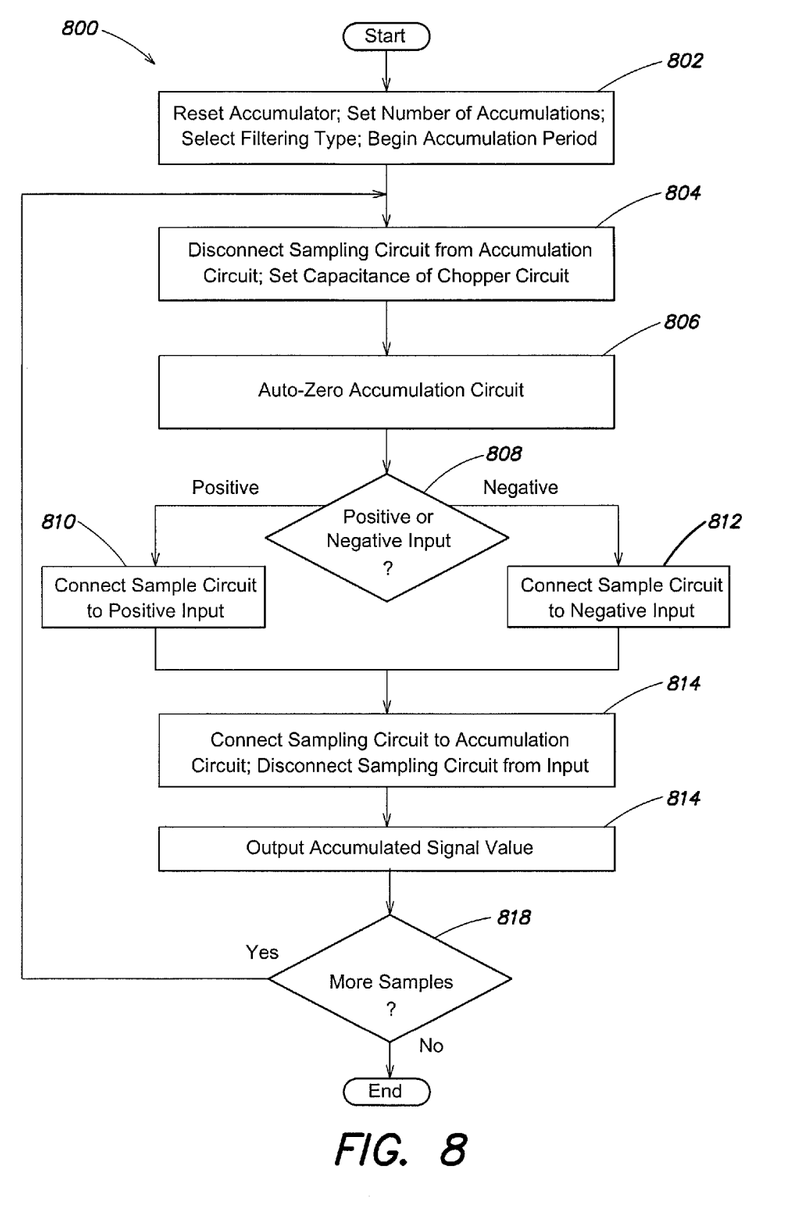
FIG. 8 is a flowchart of a method of operating an analog accumulator, which may be implemented in some embodiments.

FIG. 8 illustrates a process that may be implemented by some analog accumulators operating in accordance with techniques described herein. It should be appreciated, however, that embodiments are not limited to implementing the process of FIG. 8 and that other processes are possible.

The process 800 of FIG. 8 begins in block 802, in which operations to start an accumulation are carried out. In block 802, the accumulator is reset, which may include clearing a value stored by the accumulator during a previous accumulation period. In some embodiments, the accumulator may include a capacitor to store the value and, in block 802, the capacitor may be cleared such that the capacitor does not store a charge. A number of samples to be taken during the accumulation period and a type of filtering to implement in a sampling circuit of the accumulator may also be set in block 802. The number of samples and filtering type may be set based on input from any suitable source, which may be a human source or another component of a circuit in which the accumulator is included. Once the accumulator is reset and the number of samples and filtering type are selected in block 802, the accumulation period begins.

In block 804, the accumulator enters a sampling phase of operation. In the sampling phase, the accumulator disconnects a sampling circuit of the accumulator from the accumulation circuit of the accumulator. In addition, in block 804, the accumulator sets capacitance values of the sampling circuit (e.g., capacitance values of one or more capacitors of a switched capacitor circuit, a chopping circuit, or other circuit). In some embodiments, as discussed above in connection with FIG. 4, capacitance values of the sampling circuit may be varied between sampling phases. In these embodiments, the accumulator sets the capacitance values for a sampling phase in block 804.

In block 806, during the sampling phase, the accumulator auto-zeros the accumulation circuit of the accumulator. As discussed above, to prevent noise that is inserted by the accumulation circuit from being accumulated through successive samples, the accumulator may auto-zero the accumulation circuit during some or all of the sampling phases carried out during an accumulation period. As part of auto-zeroing the accumulation circuit, the accumulator samples a voltage of the accumulator to determine an amount of noise that is added to a signal by the accumulation circuit, such that the noise can be compensated for in a subsequent transfer phase. The voltage of the accumulator that is sampled may be an output voltage of the accumulator, which may be sampled from a feedback loop of an operational amplifier of the accumulator during a time that the operational amplifier is connected to a particular voltage, such as a ground voltage or a common mode voltage.

In blocks 808-810, as part of the sampling phase, the sampling circuit of the accumulator is connected to an input signal. In some embodiments in which an input signal is in the form of two differential input signals, the sampling circuit may be connected to a positive input signal and to a negative input signal during different sampling phases. For example, the sampling circuit may be connected to the positive input signal and to the negative input signal during alternate sampling phases. As another example, the sampling circuit may be connected to the positive input signal for one or more sampling phases, after which the sampling circuit may be connected to the negative input signal for one or more sampling phases. In some such embodiments, the number of sampling phases during which the sampling circuit is connected to the positive input before being connected to the negative input may be different than the number of sampling phases during which the sampling circuit is connected to the negative input before being connected to the positive input. In some embodiments, an accumulator may be a differential accumulator and may include a positive circuit and a negative circuit. In some such embodiments, when a positive circuit is connected to a positive input, a negative circuit may be connected to a negative input, and when the positive circuit is connected to the negative input, the negative circuit may be connected to the positive input.

As discussed above in connection with FIG. 1, the sampling circuit may be connected to the positive input signal and the negative input signal in some embodiments to assist with canceling noise in the input signal.

Accordingly, in block 808, the accumulator determines whether the sampling circuit is to be connected to the positive input signal or to the negative input signal. If the accumulator determines in block 808 that the sampling circuit is to be connected to the positive input signal, then in block 810 the accumulator connects the sampling circuit to and samples the positive input signal. If, however, the accumulator determines that the sampling circuit is to be connected to the negative input signal, then in block 812 the accumulator connects the sampling circuit to the negative input signal. The determination and connection of blocks 808-810 may be carried out in any suitable manner, as embodiments are not limited in this respect. In some embodiments, the determination may be made in accordance with one or more clock signals received by the accumulator that control the state of switches that connect components of the accumulator to one another.

Following block 810 or 812, the sampling phase ends and the transfer phase of the accumulator begins. In block 814, the accumulator connects the sampling circuit to the accumulation circuit and disconnects the sampling circuit from the input signal. As a result of block 814, when the sampling circuit is connected to the accumulation circuit, the accumulation circuit accumulates the sampled signal stored by the sampling circuit. By accumulating the sampled signal, the accumulation circuit adds a voltage of the sampled signal to a voltage stored by the accumulation circuit. As a result, the voltage stored by the accumulation circuit is updated to reflect the sampled signal. In block 816, the accumulator outputs the voltage stored by the accumulation circuit.

In block 818, the accumulator determines whether more samples of the input signal are to be taken. If so, the accumulator returns to block 804. Through successive iterations of the loop bounded by the determination of block 818, the voltage output by the accumulator in block 816 grows larger as the accumulator sums more input signals. Once the accumulator has collected the number of samples that was set in block 802, the accumulator determines in block 818 that no more samples are to be collected and the process 800 ends.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. An apparatus comprising:
an accumulator configured to operate, during an accumulation period in which an input signal is being accumulated by the accumulator, in successive sampling phases and transfer phases;
wherein the accumulator comprises:
an accumulation circuit,
a sampling circuit configured to disconnect from the accumulation circuit and sample the input signal during a sampling phase, and to disconnect from the input signal and provide a sample of the input signal to the accumulation circuit during a transfer phase, the transfer phase being out of phase with the accumulation phase, and
a circuit configured to determine, during at least some of the successive sampling phases, a noise inserted by the accumulator into an accumulated signal maintained by the accumulator.

2. The apparatus of claim 1, wherein:
the circuit includes a capacitor that, during the at least some of the successive sampling phases, is charged with a voltage indicative of the noise inserted by the accumulator; and
during the transfer phase, the sampling circuit is connected to the accumulation circuit via the capacitor and charges the capacitor with the sample of the input signal.

3. The apparatus of claim 2, wherein:
the accumulation circuit comprises an operational amplifier and, during the sampling phase, a first feedback loop and, during the transfer phase, a second feedback loop, the first feedback loop including at least one circuit component not included in the second feedback loop;
during the sampling phase, a node at a first voltage is connected to the operational amplifier via the capacitor and the capacitor is charged with the voltage indicative of the noise inserted by the accumulator and the sampling circuit is disconnected from the capacitor.

4. The apparatus of claim 3, wherein:
the accumulation circuit comprises a first capacitor and a second capacitor that, during the transfer phase, are charged with the accumulated signal; and
the first feedback loop comprises the first capacitor and the second feedback loop comprises the second capacitor.

5. The apparatus of claim 4, wherein, during the transfer phase, the second capacitor is charged by the output of the operational amplifier.

6. The apparatus of claim 3, wherein:
the accumulator is a differential accumulator; and
the node at the first voltage is a node at a common-mode voltage of the differential accumulator.

7. The apparatus of claim 3, wherein:
the first feedback loop and the second feedback loop are both connected to a first output terminal of the operational amplifier and to a first input terminal of the operational amplifier.

8. The apparatus of claim 1, wherein the circuit to determine the noise comprises at least one of a circuit to determine a DC offset and a flicker noise of the accumulator.

9. The apparatus of claim 8, wherein:
the accumulator comprises an operational amplifier and at least one feedback loop connected to an output terminal of the operational amplifier and an input terminal of the operational amplifier; and
the circuit configured to determine the noise comprises a circuit configured to determine a DC offset of the operational amplifier, a flicker noise of at least one of the operational amplifier and the at least one feedback loop.

10. The apparatus of claim 1, wherein the circuit configured to determine the noise inserted by the accumulator is a circuit for auto-zeroing the accumulator.

11. The apparatus of claim 1, wherein the accumulator is arranged to compensate for the noise determined by the circuit.

12. The apparatus of claim 1, wherein:
the accumulator is operated in the sampling phase a plurality of times during the accumulation period; and
the circuit is arranged to determine the noise inserted by the accumulator each time the accumulator is operated in the sampling phase.

13. The apparatus of claim 1, wherein the accumulator comprises a second circuit, the second circuit comprising a plurality of switches and a plurality of capacitors, each switch corresponding to one or more capacitors and adding the one or more capacitors to the second circuit based on a state of the switch.

14. The apparatus of claim 13, wherein the accumulator further comprises:
at least one storage configured to store a plurality of values that indicate states of the plurality of switches,
wherein states of the plurality of switches are set in accordance with the plurality of values.

15. The apparatus of claim 14, wherein:
the at least one storage stores a plurality of sets of values, each set of values of the plurality of sets corresponding to states of the plurality of switches;
during a first sampling phase of the accumulation period, the accumulator sets states of the plurality of switches of the second circuit in accordance with a first set of values of the plurality of sets of values; and
during a second sampling phase of the accumulation period, the accumulator sets states of the plurality of switches of the second circuit in accordance with a second set of values of the plurality of sets of values.

16. The apparatus of claim 13, wherein the second circuit is programmable to apply a filtering window of a plurality of filtering windows during a sampling phase of the accumulation period.

17. An apparatus comprising:
an accumulator to operate, during an accumulation period in which an input signal is being accumulated by the accumulator, in successive sampling phases and transfer phases,
wherein the accumulator comprises means for determining, during at least some of the successive sampling phases, a DC offset and a flicker noise inserted by the accumulator into an accumulated signal maintained by the accumulator.

18. The apparatus of claim 17, wherein the means for determining the noise comprises a means for compensating for the noise inserted by the accumulator into the accumulated signal.

19. The apparatus of claim 17, wherein the means for determining the noise comprises a means for auto-zeroing the accumulator during at least some of the successive sampling phases.

20. The apparatus of claim 17, wherein the means for determining the noise during at least some of the successive sampling phases is a means for determining the noise during each of the successive sampling phases.

21. An apparatus comprising:
a touch screen; and
a circuit for detecting a touch on the touch screen, the circuit comprising:
a capacitance-to-voltage converter configured to detect a capacitance of at least a part of the touch screen and output a signal having a voltage based on the capacitance; and
an analog accumulator configured to receive the signal and, over an accumulation period, sample and accumulate the signal, wherein the analog accumulator operates, during an accumulation period in which an input signal is being accumulated by the accumulator, in successive sampling phases and transfer phases, and wherein the accumulator comprises a circuit configured to determine, during at least some of the successive sampling phases, a noise inserted by the accumulator into an accumulated signal maintained by the accumulator.

22. The apparatus of claim 21, wherein:
the accumulator is operated in the sampling phase a plurality of times during the accumulation period; and
the circuit is arranged to determine the noise inserted by the accumulator each time the accumulator is operated in the sampling phase.

23. The apparatus of claim 22, wherein:
the accumulator comprises a sampling circuit and an accumulation circuit;
during a sampling phase, the sampling circuit is disconnected from the accumulation circuit and samples an input signal;
during a transfer phase, the sampling circuit is disconnected from the input signal and provides a sample of the input signal to the accumulation circuit; and
the sampling phase and the transfer phase are out of phase.

24. The apparatus of claim 23, wherein:
  the circuit includes a capacitor that, during the at least some of the successive sampling phases, is charged with a voltage indicative of the noise inserted by the accumulator; and
  during the transfer phase, the sampling circuit is connected to the accumulation circuit via the capacitor and charges the capacitor with the sample of the input signal.

25. The apparatus of claim 24, wherein:
  the accumulation circuit comprises an operational amplifier and, during the sampling phase, a first feedback loop and, during the transfer phase, a second feedback loop, the first feedback loop including at least one circuit component not included in the second feedback loop;
  during the sampling phase, a node at a first voltage is connected to the operational amplifier via the capacitor and the capacitor is charged with the voltage indicative of the noise inserted by the accumulator and the sampling circuit is disconnected from the capacitor.

26. A method of operating an accumulator to produce an accumulated signal, the accumulator including a sampling circuit and an accumulation circuit, the method comprising:
  disconnecting the sampling circuit from the accumulation circuit;
  during a time that the sampling circuit is disconnected from the accumulation circuit,
    sampling an input signal to produce a sampled signal, and
    determining a noise inserted into the accumulated signal by the accumulation circuit;
  disconnecting the sampling circuit from a source of the input signal;
  connecting the sampling circuit to the accumulation circuit; and
  transferring the sampled signal from the sampling circuit to the accumulation circuit, wherein transferring the sampled signal comprises compensating for the noise inserted into the accumulated signal by the accumulation circuit.

27. The method of claim 26, wherein:
  determining the noise inserted into the accumulated signal by the accumulation circuit comprises charging a capacitor based on the noise; and
  compensating for the noise comprises further charging the capacitor with the sampled signal.

28. The method of claim 27, wherein further charging the capacitor with the sampled signal comprises transferring the sampled signal to the accumulation circuit via the capacitor.

29. The method of claim 26, further comprising:
  accumulating the input signal during an accumulation period, wherein accumulating the input signal comprises sampling the input signal a first plurality of times during the accumulation period, and wherein sampling the input signal comprises, during each sampling, the disconnecting, the sampling, the disconnecting, the connecting, and transferring the sampled signal from the sampling circuit to the accumulation circuit; and
  wherein sampling the input signal a second plurality of times of the first plurality of times comprises determining the noise inserted into the accumulated signal by the accumulation circuit and compensating for the noise inserted into the accumulated signal by the accumulation circuit.

30. The method of claim 29, wherein the second plurality of times is fewer than all of the first plurality of times.

31. The method of claim 29, wherein the second plurality of times is all of the first plurality of times.

32. The method of claim 26, wherein:
  the accumulator comprises a variable-capacitance circuit; and
  the method further comprises configuring the variable-capacitance circuit to implement a filtering window.

33. The method of claim 26, wherein determining the noise comprises sampling an output voltage of the accumulator during the time that the accumulation circuit is disconnected from the sampling circuit.

34. An apparatus comprising:
  an accumulator configured to operate, during an accumulation period in which an input signal is being accumulated by the accumulator, in successive sampling phases and transfer phases;
  wherein the accumulator comprises:
    a circuit configured to determine, during at least some of the successive sampling phases, a noise inserted by the accumulator into an accumulated signal maintained by the accumulator, and
    a second circuit comprising a plurality of switches and a plurality of capacitors, each switch corresponding to one or more capacitors and adding the one or more capacitors to the second circuit based on a state of the switch.

35. The apparatus of claim 34, wherein the accumulator further comprises:
  at least one storage configured to store a plurality of values that indicate states of the plurality of switches,
  wherein states of the plurality of switches are set in accordance with the plurality of values.

36. The apparatus of claim 35, wherein:
  the at least one storage is further configured to store a plurality of sets of values, each set of values of the plurality of sets corresponding to states of the plurality of switches;
  during a first sampling phase of the accumulation period, the accumulator sets states of the plurality of switches of the second circuit in accordance with a first set of values of the plurality of sets of values; and
  during a second sampling phase of the accumulation period, the accumulator sets states of the plurality of switches of the second circuit in accordance with a second set of values of the plurality of sets of values.

37. The apparatus of claim 34, wherein the second circuit is programmable to apply a filtering window of a plurality of filtering windows during a sampling phase of the accumulation period.

38. The apparatus of claim 34, wherein the second circuit is configured to disconnect from the accumulation circuit and sample the input signal during a sampling phase, and to disconnect from the input signal and provide a sample of the input signal to the accumulation circuit during a transfer phase, the transfer phase being out of phase with the accumulation phase.

39. The apparatus of claim 34, wherein the circuit configured to determine the noise inserted by the accumulator is a circuit for auto-zeroing the accumulator.

40. The apparatus of claim 34, wherein the accumulator is configured to compensate for the noise determined by the circuit.

* * * * *